(12) United States Patent
Alcantara Marte et al.

(10) Patent No.: US 10,486,362 B2
(45) Date of Patent: Nov. 26, 2019

(54) METHOD AND CONNECTING SUPPORTS FOR ADDITIVE MANUFACTURING

(71) Applicant: GENERAL ELECTRIC COMPANY, Schenectady, NY (US)

(72) Inventors: Eliezer Manuel Alcantara Marte, Cincinnati, OH (US); Thomas Sinnett, Cincinnati, OH (US); Daniel Joerger, Cincinnati, OH (US); Neal Dunham, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 527 days.

(21) Appl. No.: 15/042,024

(22) Filed: Feb. 11, 2016

(65) Prior Publication Data
US 2017/0232683 A1    Aug. 17, 2017

(51) Int. Cl.
| | |
|---|---|
| *B29C 64/153* | (2017.01) |
| *B29C 64/40* | (2017.01) |
| *B22F 3/105* | (2006.01) |
| *B33Y 10/00* | (2015.01) |
| *B33Y 40/00* | (2015.01) |
| *B29K 105/00* | (2006.01) |

(52) U.S. Cl.
CPC .......... *B29C 64/153* (2017.08); *B22F 3/1055* (2013.01); *B29C 64/40* (2017.08); *B22F 2003/1058* (2013.01); *B29K 2105/251* (2013.01); *B33Y 10/00* (2014.12); *B33Y 40/00* (2014.12); *Y02P 10/295* (2015.11)

(58) Field of Classification Search
None
See application file for complete search history.

(56) References Cited

U.S. PATENT DOCUMENTS

| | | |
|---|---|---|
| 4,863,538 A | 9/1989 | Deckard |
| 5,460,758 A | 10/1995 | Langer et al. |
| 5,529,471 A | 6/1996 | Khoshevis |
| 5,656,230 A | 8/1997 | Khoshevis |
| 5,837,960 A | 11/1998 | Lewis et al. |

(Continued)

FOREIGN PATENT DOCUMENTS

| | | |
|---|---|---|
| EP | 2570595 A1 | 3/2013 |
| EP | 3 015 251 A1 | 5/2016 |

(Continued)

OTHER PUBLICATIONS

Certified Great Britain Patent Applicaton No. 1504603.0, filed on Mar. 18, 2015, in Great Britain, issue date of certification Jun. 17, 2016.*

(Continued)

*Primary Examiner* — Janis L Dote
(74) *Attorney, Agent, or Firm* — Dority & Manning, P.A.

(57) ABSTRACT

The present disclosure generally relates to methods for additive manufacturing (AM) that utilize connecting support structures in the process of building objects, as well as novel connecting support structures to be used within these AM processes. The connecting support structures include two fused connections to the object and an axial direction between the fused connections, a perimeter of fused material about the axial direction, and unfused powder or air completely surrounding the perimeter of fused material.

17 Claims, 4 Drawing Sheets

(56) References Cited

U.S. PATENT DOCUMENTS

| | | | |
|---|---|---|---|
| 5,897,825 | A | 4/1999 | Fruth et al. |
| 6,471,800 | B2 | 10/2002 | Jang et al. |
| 6,995,334 | B1 | 2/2006 | Kovacevic et al. |
| 7,381,921 | B2 | 6/2008 | Hagemeister et al. |
| 7,435,072 | B2 | 10/2008 | Collins et al. |
| 8,470,234 | B2 | 6/2013 | Clark |
| 8,506,836 | B2 | 8/2013 | Szuromi et al. |
| 8,684,069 | B2 | 4/2014 | Mottin et al. |
| 9,188,341 | B2 | 11/2015 | McMasters et al. |
| 2002/0062909 | A1 | 5/2002 | Jang et al. |
| 2002/0171177 | A1 | 11/2002 | Kritchman et al. |
| 2013/0071562 | A1 | 3/2013 | Szuromi et al. |
| 2013/0316084 | A1 | 11/2013 | Szuromi et al. |
| 2014/0251481 | A1 | 9/2014 | Kroll et al. |
| 2014/0335313 | A1 | 11/2014 | Chou et al. |
| 2015/0021379 | A1 | 1/2015 | Albrecht et al. |
| 2015/0061190 | A1 | 3/2015 | Yakubov et al. |
| 2016/0229127 | A1* | 8/2016 | Halliday ............ B29C 67/0092 |
| 2016/0271699 | A1* | 9/2016 | Illston ................. B22F 3/1055 |
| 2017/0203365 | A1 | 7/2017 | Pays et al. |
| 2017/0232511 | A1 | 8/2017 | Fieldman et al. |
| 2017/0232512 | A1 | 8/2017 | Joerger |
| 2017/0232670 | A1 | 8/2017 | Joerger et al. |
| 2017/0232671 | A1 | 8/2017 | Fieldman |
| 2017/0232672 | A1 | 8/2017 | Fieldman et al. |
| 2017/0232682 | A1 | 8/2017 | Alcantara Marte et al. |

FOREIGN PATENT DOCUMENTS

| | | |
|---|---|---|
| FR | 3 024 060 A1 | 1/2016 |
| JP | 2013-184405 A | 9/2013 |
| WO | WO 2014/071135 A1 | 5/2014 |
| WO | 2014/208743 A1 | 12/2014 |

OTHER PUBLICATIONS

Extended European Search Report and Opinion issued in connection with corresponding EP Application No. 17155576.6 dated Jul. 3, 2017.

* cited by examiner

METHOD AND CONNECTING SUPPORTS FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. No. 4,863,538 and U.S. Pat. No. 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress relief process. Additionally, thermal, mechanical, and chemical post processing procedures can be used to finish the part 122.

The present inventors have discovered that the additive manufacturing process described above may present difficulties for objects having large height to width aspect ratios (e.g., tall objects). For example, tall objects may be prone to damage from a recoater arm because the tall object may act as a lever exerting force on a lower portion of the object. Accordingly, even if a tall object is connected to a build plate or otherwise vertically supported from underneath, the tall object may tip over or bend due to lateral forces.

In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect, the disclosure provides a method for fabricating an object. The method includes (a) irradiating a layer of powder in a powder bed to form a fused region; (b) providing a subsequent layer of powder over the powder bed by passing a recoater arm over the powder bed from a first side of the powder bed; and (c) repeating steps (a) and (b) until the object and a support is formed in the powder bed. The support includes two fused connections to the object and an axial direction between the fused connections, a perimeter of fused material about the axial direction, and unfused powder or air completely surrounding the perimeter of fused material.

These and other aspects of the invention will become more fully understood upon a review of the detailed description, which follows.

DETAILED DESCRIPTION

Figure 2:
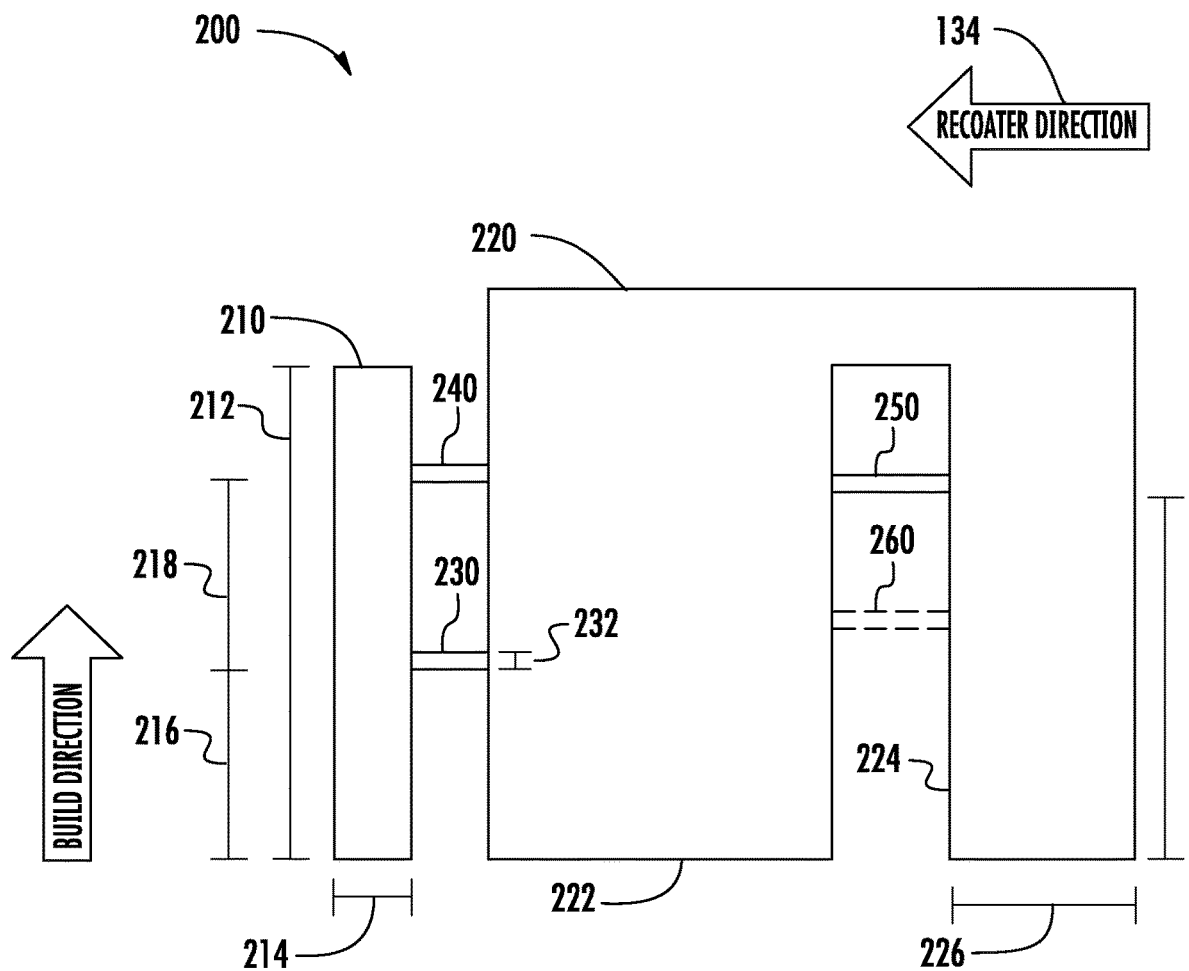
FIG. 2 illustrates a schematic side view of an example of a first object connected to a second object via supports in accordance with aspects of the present invention.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts FIG. 2 is a diagram 200 conceptually illustrating an example of a first object 210 connected to a second object 220 via supports 230, 240. For example, the diagram 200 represents a cross sectional view of the first object 210 and the second object 220. In an aspect, the first object 210 has a total height 212 and a constant width 214. For example the aspect ratio of the total height 212 to width 214 is from about 15:1 to about 2:1 in one aspect, from about 12:1 to about 4:1 in another aspect, and about 10:1 to about 6:1 in another aspect. Preferably, the aspect ratio of the object may be about 3.5 or greater. That is, the height of the object is many times larger than its width.

The first object 210 and second object 220 may be manufactured according to an AM process. For example, the apparatus 100 of FIG. 1 and method described above may be used. In this type of AM process, the object 210 and the object 220 are built layer-by-layer by selectively sintering or melting areas of the powder in the regions that form the object 210 and/or the object 220. The object 210 is built simultaneously with the object 220 by melting or sintering additional regions of the powder in the location of the object 210. Further, the supports 230 and 240 may be built in one or more layers of the powder by melting or sintering additional regions of the powder in the location between the object 210 and the object 220.

For example, as the first object 210 is built, layer-by-layer, when the height reaches the level 216, the height-to-width aspect ratio of the object 210 exceeds a threshold value. In an aspect, the threshold value is about 2 to about 5 in one aspect, from 3 to about 4 in another aspect, and about 3.2 to about 3.8 in another aspect. The threshold value depends on factors such as the powdery material being melted, the melting temperature, and cooling time.

The apparatus 100 builds the support 230 connecting the object 210 with the object 220 at the level 216. As illustrated, the support 230 may be a horizontal support spanning the horizontal distance between the object 210 and the object 220. In an aspect, the support 230 may include a horizontal layer where at least one line of powder along an axial direction is fused between the object 210 and the object 220. The support 230 includes two fused connections where the support 230 connects to each of the object 210 and the object 220. The support further includes an axial direction between the fused connections and a perimeter of fused material about the axial direction. The support 230 is surrounded by powder except where the support 230 is fused to the object 210 and the object 220. The perimeter of fused material is completely surrounded by powder. In other words, powder is located above and below the support 230 and to each side of the support 230. When the object 210 and the object 220 are removed from the powder, the support 230 and/or perimeter of fused material is surrounded by air. The support 230 has a thickness 232 between a top surface and a bottom surface of the perimeter of fused material. The thickness 232 may be less than the level 216. For example, the thickness 232 may be equal to a height of an incremental layer of powder. In another aspect, the thickness 232 is less than a length of the support 230 between the object 210 and the object 220.

As the apparatus 100 continues building the first object 210, layer-by-layer, when the height reaches the level 218, the height-to-width aspect ratio of the object 210 measured from the level 216 to the level 218 exceeds the threshold value. The apparatus 100 builds the support 240 connecting the object 210 with the object 220 at the level 218. As illustrated, the support 240 is similar to the support 230. Further, because the width 214 of the first object 210 is constant, the level 216 is equal to the difference between the level 218 and the level 216. In other words, the level 218 is a multiple of the level 216. Accordingly, the supports 230 and 240 are built at regular intervals. Additional supports may be built at regular intervals depending on the total height 212.

In another aspect, the object 220 includes a first portion 222 and a second portion 224. The first portion 222 and the second portion 224 eventually connect, but as the object 220 is being built layer-by-layer, the first portion 222 and the second portion 224 are separate. In an aspect, the second portion 224 has a width 226. As illustrated, for example, the second portion 224 has the total height 212 to the point where it joins the first portion 222. When the second portion 224 reaches the level 218, the height-to-width aspect ratio of the second portion 224 exceeds the threshold value. For example, as illustrated, the width 226 is greater than the width 214 of the first object 210, and the level 218 is greater than the level 216. In an aspect, the support 250 is built at the level 218. The support 250 is similar to the support 230 but spans a horizontal distance between the second portion 224 and the first portion 222. Accordingly, the different portions of the object 220 are supported as the object 220 is built. In another aspect, the apparatus 100 builds a support 260 at a level that divides the total height 212 of the second portion into equal sub-portions such that a height-to-width aspect ratio of each sub-portion is less than the threshold value.

Figure 1:
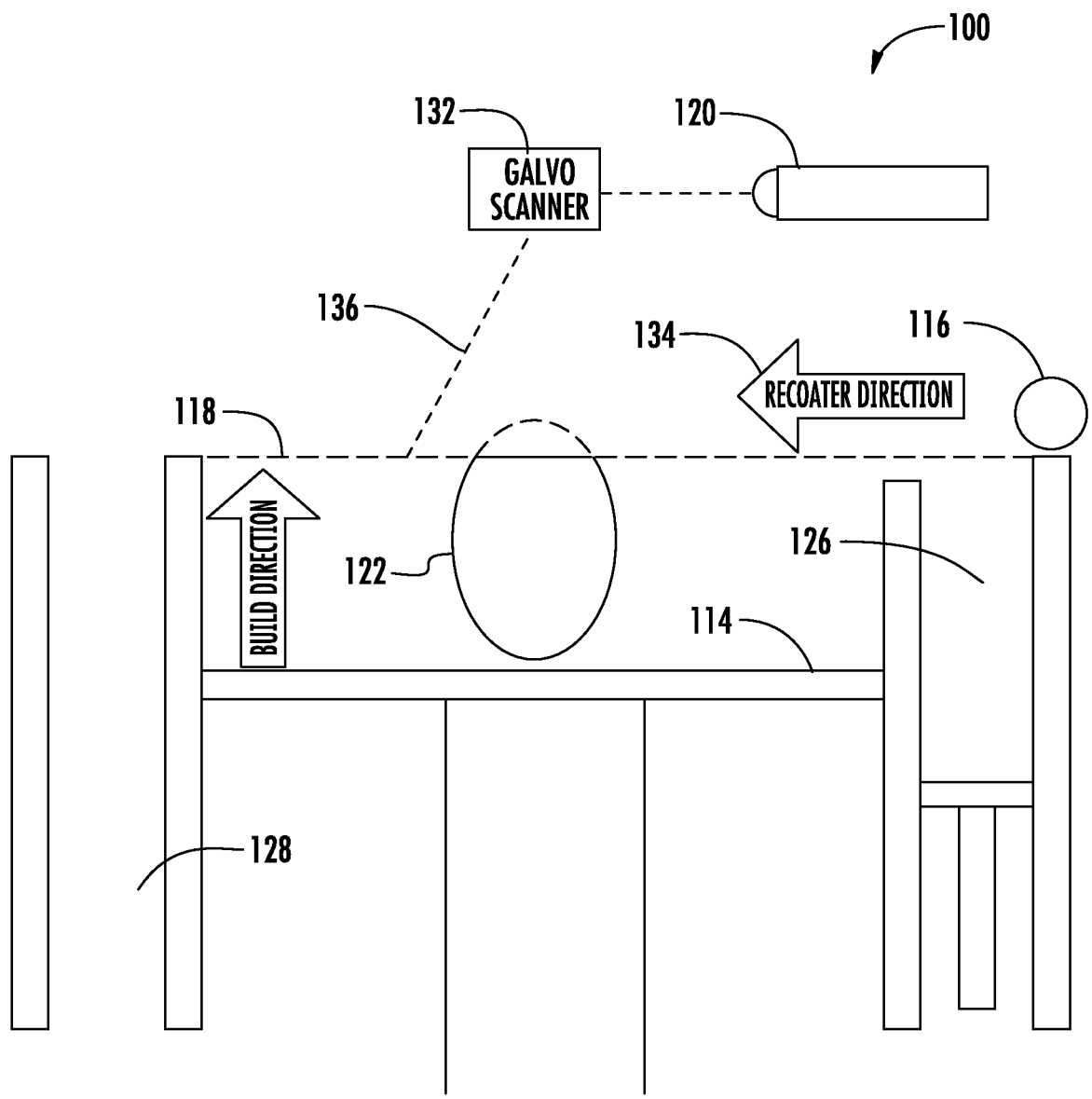
FIG. 1 is schematic diagram showing an example of a conventional apparatus for additive manufacturing.
Figure 3:
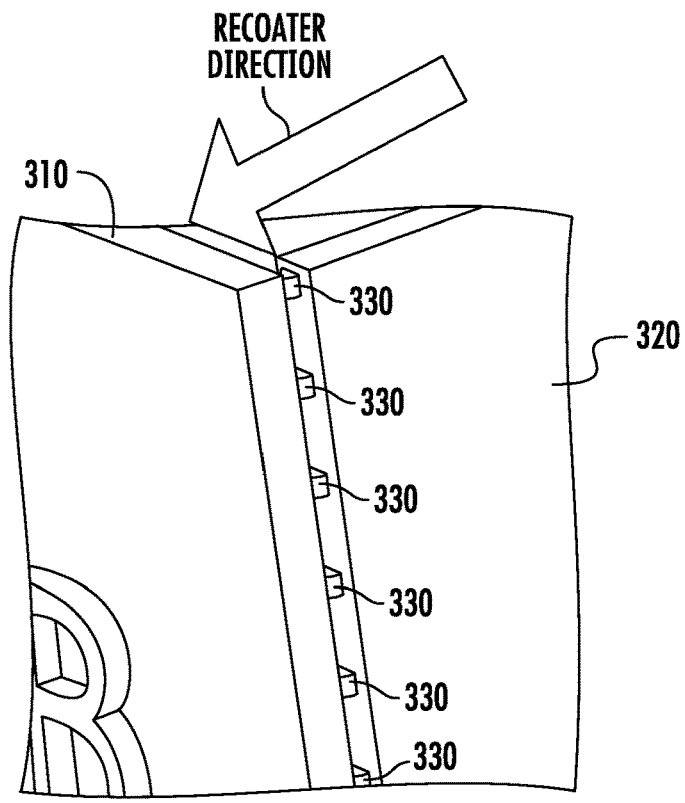
FIG. 3 illustrates a perspective view of another example of two objects connected by supports in accordance with aspects of the present invention.

FIG. 3 illustrates another example of an object 310 connected to an object 320 by supports 330. In an aspect, the object 310 has a tall geometry with a large height-to-width aspect ratio. In an aspect, the recoater 116 (FIG. 1) moves in a direction parallel with a minimum dimension of the object 310. The recoater 116 (FIG. 1) may contact the top of the object 310 or otherwise exert lateral force on the object 310. For example, the recoater 116 (FIG. 1) may cause the powder to move and apply force to the object 310. In an aspect, the apparatus 100 builds supports 330 at regular intervals such that a height-to-width aspect ratio of a portion of the object 310 above the preceding support 330 is less than the threshold value. The supports 310 resist lateral forces exerted by the recoater 116 (FIG. 1). Because the portion of the object above the preceding support is less than the threshold, the portion of the object above the preceding support is unlikely to tip over, bend, or otherwise suffer damage from the lateral forces.

Figure 4:
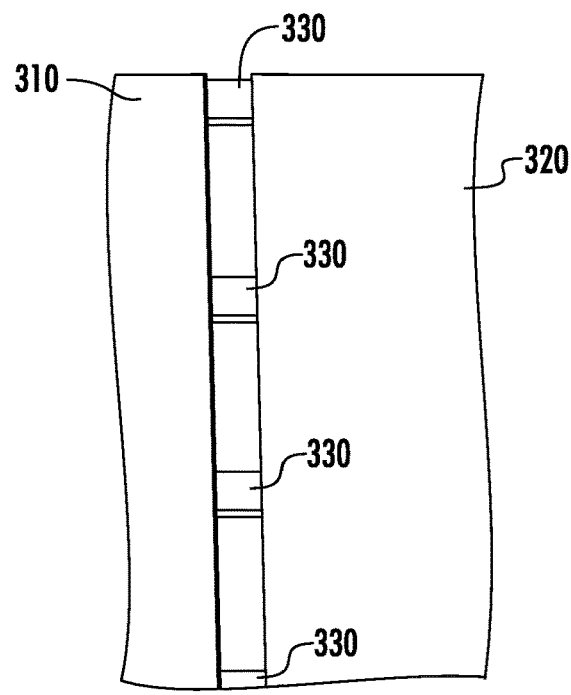
FIG. 4 illustrates a side view of the objects in FIG. 3.

FIG. 4 illustrates another view of the example object 310 and object 320 connected by supports 330.

Figure 5:
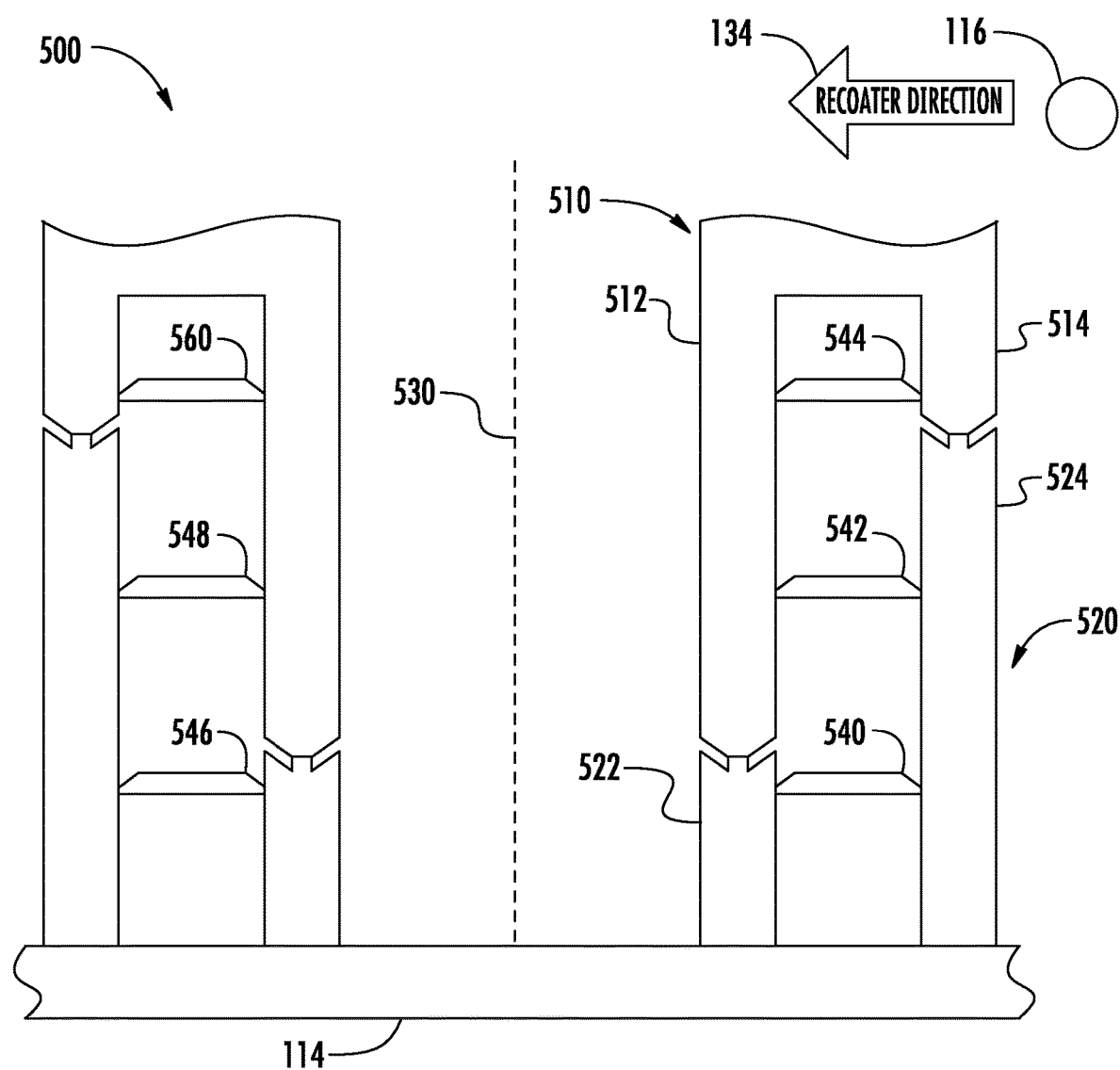
FIG. 5 illustrates a cross-sectional view of an example of an object and support structures connected by supports in accordance with aspects of the present invention.

FIG. 5 illustrates an example of a vertical cross-sectional view of a support structure 520 for an object 510 including cylindrical members 512 and 514. Both the object 510 and the support structure 520 may have a center at the axis 530. The cylindrical member 512 faces downward and forms a ring. A second cylindrical member 514 forms a concentric ring connected to the cylindrical member 512 via the object 510. The support structure 520 may generally be built from a platform 114 up to a layer where each portion of the object 500 starts. For example, the support structure 520 includes a supports 522 and 524 vertically supporting the cylindrical members 512 and 514, respectively. In an aspect, the cylindrical members 512, 514 or the supports 522, 524 have a large height-to-width aspect ratio. In an aspect, the object 510 is a first structure and the support structure 520 may be considered as one or more second structures. In an aspect, a horizontal supports 540, 542, 544, 546, 548, 560 support portions of the object 510 or the support structure 520 having a height-to-width aspect exceeding a threshold. The horizontal supports are formed in one or more horizontal layers. As illustrated, for example, the horizontal supports 540, 542, 544, 546, 548, 560 have tapered ends that limit the connection area to the object 510 and the support structure 520 to facilitate removal of the horizontal supports. The horizontal supports 540, 546 connect support 522 of the support structure 520 to support 524. The horizontal supports 542, 548 connect support 524 of the support structure 520 to cylindrical member 512 of the object 510. The horizontal supports 544, 560 connect the cylindrical member 512 of the object 510 to cylindrical member 514 of the object 510. Each of the horizontal supports 540, 542, 544, 546, 548, 560 is surrounded by powder except where the support is connected to the object 510 or the support structure 520. In one aspect, the horizontal supports are built parallel to the recoater direction 134. For example, the horizontal supports 540 and 546 are thin lines providing support against movement in the recoater direction 134. For example, the horizontal supports 540 and 546 have a similar height and width. The horizontal supports 540 and 546 are not connected even though they are built at least partially in the same layer.

When it becomes necessary to remove the horizontal supports from the object, the operator may apply force to break the horizontal supports free. The supports may be removed by mechanical procedures such as twisting, breaking, cutting, grinding, filing, or polishing. Additionally, thermal and chemical post processing procedures may be used to finish the object. The removal of the horizontal supports from the object may take place immediately upon or during removal of the object from the powder bed. Alternatively, the horizontal supports may be removed after any one of the post-treatment steps. For example, the object and support structure may be subjected to a post-anneal treatment and/or chemical treatment and then subsequently removed from the object and/or build plate.

Although several examples of support structures and objects have been provided, it should be apparent that other objects may be built in accordance with the present disclosure. For example, any object having a large height to width aspect ratio may be supported by one or more of the disclosed support structures. In an aspect, the disclosed support structures are used to manufacture parts for aircraft. For example, a fuel nozzle similar to the one disclosed in U.S. Pat. No. 9,188,341 may be manufactured using support structures disclosed herein.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application No. 15/042,019, titled "METHOD AND CONFORMAL SUPPORTS FOR ADDITIVE MANUFACTURING," and filed Feb. 11, 2016;

U.S. patent application No. 15/041,973, titled "METHODS AND SURROUNDING SUPPORTS FOR ADDITIVE MANUFACTURING," and filed Feb. 11, 2016;

U.S. patent application No. 15/042,010, titled "METHODS AND KEYWAY SUPPORTS FOR ADDITIVE MANUFACTURING," and filed Feb. 11, 2016;

U.S. patent application No. 15/042,001, titled "METHODS AND BREAKABLE SUPPORTS FOR ADDITIVE MANUFACTURING," and filed Feb. 11, 2016;

U.S. patent application No. 15/041,991, titled "METHODS AND LEADING EDGE SUPPORTS FOR ADDITIVE MANUFACTURING," and filed Feb. 11, 2016; and U.S. patent application No. 15/041,980, titled "METHOD AND SUPPORTS WITH POWDER REMOVAL PORTS FOR ADDITIVE MANUFACTURING," and filed Feb. 11, 2016.

The disclosure of each of these application are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface still provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object, comprising:
   (a) irradiating a layer of powder in a powder bed to form a fused region;
   (b) providing a subsequent layer of powder over the powder bed by passing a recoater arm over the powder bed from a first side of the powder bed; and
   (c) repeating steps (a) and (b) until the object and a support is formed in the powder bed,
   wherein the support includes two fused connections to the object and a horizontal layer along an axial direction between the fused connections, the horizontal layer comprising a perimeter of fused material about the axial direction, and wherein the powder bed comprises unfused powder or air completely surrounding the perimeter of fused material; and
   wherein the perimeter of fused material has a tapered end adjacent to the fused connections.

2. The method of claim 1, further comprising (d) repeating steps (a) and (b) until at least one additional support is formed in the powder bed, wherein each additional support includes two additional fused connections to the object and an additional horizontal layer along an axial direction between the additional fused connections, the additional horizontal layer comprising an additional perimeter of fused material about the additional axial direction, and wherein the powder bed comprises unfused powder or air completely surrounding the additional perimeter of fused material.

3. The method of claim 2, wherein the two fused connections to the object are at a first height and each additional fused connection is at a multiple of the first height.

4. The method of claim 2, wherein the support and the at least one additional support together comprises two supports.

5. The method of claim 2, wherein the support and the at least one additional support together comprises three supports.

6. The method of claim 2, wherein the support and the at least one additional support together comprise a plurality of supports located at regular intervals.

7. The method of claim 1, wherein the perimeter of fused material has a thickness between a top surface and a bottom surface that is less than a length of the support between the two fused connections.

8. The method of claim 7, wherein the two fused connections to the object are at a first height measured between a bottom of the object and a first level, and wherein the first height is greater than the thickness of perimeter of fused material.

9. The method of claim 8, wherein the first height is greater than a width of the object measured across the object in a recoater direction.

10. The method of claim 9, wherein an aspect ratio between the first height and the width of the object is from about 3 to about 4.

11. The method of claim 1, further comprising: (d) removing the object and the support from the powder bed while the object and the support are connected.

12. The method of claim 11, further comprising: (e) removing the support from the object.

13. The method of claim 1, wherein the object comprises cylindrical members.

14. The method of claim 1, wherein the support is parallel to the recoated direction.

15. The method of claim 1, wherein a ratio between a total height and the width of the object is from 15:1 to 2:1.

16. The method of claim 1, wherein a ratio between a total height and the width of the object is from 12:1 to 6:1.

17. The method of claim 1, wherein the method is performed using direct metal laser sintering or direct metal laser melting.

\* \* \* \* \*